US008472376B2

(12) United States Patent  (10) Patent No.: US 8,472,376 B2
Przybysz                   (45) Date of Patent:     Jun. 25, 2013

(54) HANDLING MULTIPLE USER INTERFACES IN AN IP MULTIMEDIA SUBSYSTEM

(75) Inventor: Hubert Przybysz, Hägersten (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 988 days.

(21) Appl. No.: 12/303,835

(22) PCT Filed: Jun. 9, 2006

(86) PCT No.: PCT/EP2006/063071
§ 371 (c)(1),
(2), (4) Date: Dec. 8, 2008

(87) PCT Pub. No.: WO2007/140818
PCT Pub. Date: Dec. 13, 2007

(65)          Prior Publication Data
US 2010/0232402 A1    Sep. 16, 2010

(51) Int. Cl.
*H04W 4/00*          (2009.01)
(52) U.S. Cl.
USPC ........................................ 370/328; 455/435.1
(58) Field of Classification Search
None
See application file for complete search history.

(56)          References Cited

U.S. PATENT DOCUMENTS

| 6,985,961 | B1* | 1/2006 | Ramsayer et al. | 709/238 |
| 7,024,688 | B1* | 4/2006 | Faccin et al. | 726/4 |
| 7,978,683 | B2* | 7/2011 | Balogh et al. | 370/352 |
| 8,089,956 | B2* | 1/2012 | Gu et al. | 370/354 |
| 8,185,104 | B2* | 5/2012 | Walker et al. | 455/433 |
| 8,213,932 | B2* | 7/2012 | Walker et al. | 455/433 |
| 8,230,073 | B1* | 7/2012 | Leeder et al. | 709/227 |
| 2002/0156641 | A1* | 10/2002 | Kitajima | 705/1 |
| 2004/0190702 | A1* | 9/2004 | Mayer et al. | 379/202.01 |
| 2005/0108347 | A1* | 5/2005 | Lybeck et al. | 709/207 |
| 2005/0131989 | A1* | 6/2005 | Beckmann et al. | 709/201 |
| 2005/0265382 | A1* | 12/2005 | Hartikainen | 370/465 |
| 2006/0268835 | A1* | 11/2006 | Hyotylainen et al. | 370/352 |
| 2007/0071221 | A1* | 3/2007 | Allen et al. | 379/265.01 |
| 2007/0081518 | A1* | 4/2007 | Jain et al. | 370/352 |
| 2007/0121584 | A1* | 5/2007 | Qiu et al. | 370/352 |
| 2007/0149166 | A1* | 6/2007 | Turcotte et al. | 455/404.1 |
| 2007/0159976 | A1* | 7/2007 | Dekeyzer et al. | 370/236 |
| 2008/0160995 | A1* | 7/2008 | Thiebaut et al. | 455/433 |
| 2009/0235299 | A1* | 9/2009 | Astrom et al. | 725/25 |
| 2009/0274090 | A1* | 11/2009 | Akhtar et al. | 370/328 |
| 2011/0022843 | A1* | 1/2011 | Blom et al. | 713/169 |
| 2012/0124222 | A1* | 5/2012 | Noldus et al. | 709/227 |

FOREIGN PATENT DOCUMENTS

JP   2005 252477 A   9/2005

OTHER PUBLICATIONS

3GPP. 3rd Generation Partnership Project; Technical Specification Group Services and System Aspects; Voice Call Continuity between CS and IMS; Stage 2 (Release 7). 3GPP TS 23.206 v0.3.0. Feb. 2006.

(Continued)

*Primary Examiner* — Bunjob Jaroenchonwanit

(57)          ABSTRACT

A method of operating an Internet Protocol Multimedia Subsystem (IMS) network having a plurality of user interfaces. A terminal agent is interposed between a plurality of Session Initiation Protocol (SIP) User Agents and a Serving Call/Session Control Function (S-CSCF) of the IMS network. The terminal agent registers its contact address with the S-CSCF on behalf of the plurality of SIP User Agents and emulates a single SIP User Agent to the S-CSCF.

11 Claims, 8 Drawing Sheets

OTHER PUBLICATIONS

3GPP. 3$^{rd}$ Generation Partnership Project; Technical Specification Group Core Network and Terminals; IP Multimedia Call Control Protocol Based on Session Initiation Protocol (SIP) and Session Description Protocol (SDP); Stage 3 (Release 7). 3GPP TS 24.229 v7.3.0. Mar. 2006.

3GPP. Corrections on Subscriber data handling for the IMS. TSG CN WG4. NP-040532. Dec. 2004.

3GPP. 3$^{rd}$ Generation Partnership Project; Technical Specification Group Core Network; IP Multimedia (IM) Session Handling; IM Call Model; Stagd2 (Release 5). 3GPP TS 23.218 v5.7.0. Dec. 2003.

Handley, M, et al. SIP: Session Initiation Protocol. Network Working Group. RFC 2543. Mar. 1999.

Rosenberg, J. et al. SIP: Session Initiation Protocol. Network Working Group. RFC 3261. Jun. 2002.

3GPP. 3$^{rd}$ Generation Partnership Project; Technical Specification Group Services and System Aspects; IP Multimedia Subsystem (IMS); Stage 2; (Release 5). 3GPP TS 23.228 v5.2.0. Oct. 2001.

3GPP. 3$^{rd}$ Generation Partnership Project; Technical Specification Group Services and System Aspects; IP Multimedia Subsystem (IMS); Stage 2; (Release 6). 3GPP TS 23.228 v6.12.0. Dec. 2005.

* cited by examiner

User Equipment with SIP and Non-SIP interfaces in IMS

General Model

Delegation of endpoint registration to TA

TA registration on behalf of the UE

Originating request flow

HANDLING MULTIPLE USER INTERFACES IN AN IP MULTIMEDIA SUBSYSTEM

TECHNICAL FIELD

The present invention relates to user registration in the IP Multimedia Subsystem.

BACKGROUND

IP Multimedia services provide a dynamic combination of voice, video, messaging, data, etc. within the same session. By growing the number of basic applications and the media which it is possible to combine, the number of services offered to the end users will grow, and the inter-personal communication experience will be enriched. This will lead to a new generation of personalised, rich multimedia communication services, including so-called "combinational IP Multimedia" services which are considered in more detail below.

IP Multimedia Subsystem (IMS) is the technology defined by the Third Generation Partnership Project (3GPP) to provide IP Multimedia services over mobile communication networks (3GPP TS 22.228, TS 23.218, TS 23.228, TS 24.228, TS 24.229, TS 29.228, TS 29.229, TS 29.328 and TS 29.329 Releases 5 to 7. IMS provides key features to enrich the end-user person-to-person communication experience through the use of standardised IMS Service Enablers, which facilitate new rich person-to-person (client-to-client) communication services as well as person-to-content (client-to-server) services over IP-based networks. The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly.

FIG. 1 illustrates schematically the IMS architecture according to 3GPP Release 5 (R5) and IMS Release 6 (R6). Call/Session Control Functions (CSCFs) operate as SIP proxies within the IMS. The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF.

A user registers with the IMS using the specified SIP REGISTER method. This is a mechanism for attaching to the IMS and announcing to the IMS the address at which a SIP user identity can be reached. The user receives a unique URI from the S-CSCF that it shall use when it initiates a dialog. In 3GPP, when a SIP terminal performs a registration, the IMS authenticates the user, and allocates a S-CSCF to that user from the set of available S-CSCFs. Whilst the criteria for allocating S-CSCFs is not specified by 3GPP, these may include load sharing and service requirements. It is noted that the allocation of an S-CSCF is key to controlling (and charging for) user access to IMS-based services. Operators may provide a mechanism for preventing direct user-to-user SIP sessions which would otherwise bypass the S-CSCF.

During the registration process, it is the responsibility of the I-CSCF to select an S-CSCF if one is not already selected. The I-CSCF receives the required S-CSCF capabilities from the home network's Home Subscriber Server (HSS), and selects an appropriate S-CSCF based on the received capabilities. [It is noted that S-CSCF allocation is also carried out for a user by the I-CSCF in the case where the user is called by another party, and the user is not currently allocated an S-CSCF.] When a registered user subsequently sends a session request (e.g. SIP INVITE) to the IMS, the request will include the P-CSCF and S-CSCF URIs so that the P-CSCF is able to forward the request to the selected S-CSCF. This applies both on the originating and terminating sides (of the IMS). [For the terminating call the request will include the P-CSCF address and the UE address.]

Within the IMS service network, application servers (ASs) are provided for implementing IMS service functionality. Whilst it was originally envisaged that ASs would operate as "slaves" to the IMS CSCFs, responding to requests delegated by the S-CSCFs, this need not be the case and indeed it is now expected that ASs may have interfaces to external (i.e. non-3GPP) networks, and may receive an internal stimulus to perform an action (e.g. a timer expiry). FIG. 2 illustrates the IMS Service Control (ISC) interface between an AS and an S-CSCF, as well as other interfaces within the IMS. Although the AS in FIG. 2 is shown as having only a single interface to an S-CSCF it will be appreciated that in practice the ISC interface will extend across a communication network to which many (or all) of the CSCF servers of a given operator's network are connected, allowing an AS to communicate with all of these CSCFs. [Other entities illustrated in FIG. 1 will be well known to those of skill in the art.]

A further interface (Ut) exists between the AS and the user terminal (TS23.002) although this is not shown in the Figure. The Ut interface enables the user to manage information related to his or her services, e.g. creation and assignment of Public Service Identities, management of authorisation policies that are used for example by "presence" services, conference policy management, etc.

Standardisation work is currently ongoing in 3GPP R7 in the areas of Voice Call Continuity (3GPP TS 23.206), and Handling of the Termination of Real-time Sessions and Calls (3GPP draft TR 23.819). In particular, consideration is being given to the handling of terminating real-time sessions and calls taking into account different domains (CS, IMS) and different UE capabilities. There is also an established specification for Combining Circuit Switched (CS) and IP Multimedia Subsystem (IMS) Services (3GPP TS 23.279) that is being further extended and refined in R7. These ongoing work areas are concerned with a type of User Equipment that has the ability to access IMS services through Circuit Switched (CS) and/or Packet Switched (PS) core networks. Issues arise of course in dealing with multiple, parallel IMS access routes, IMS user registration, and IMS session handling. The solutions proposed in the standards generally rely upon the IMS Application Servers handling the interactions between a given terminal and its different access domains and between the terminal and the IMS services. The problem with an Application Server level solution is that the IMS architecture becomes unnecessarily complex, requiring a large number of complex interactions over the ISC interface, and may lead to complex or unmanageable Initial Filter Criteria (IFC) in the IMS core. Application servers are forced to take decisions related to different access interfaces (and access networks) of the terminal equipment and need to enforce such decisions in the IMS core over the ISC interface, for which the ISC interface is not designed.

SUMMARY OF THE INVENTION

It is proposed here to introduce the concept of a Terminal Agent which is a new type of logical entity in the IMS network that represents and emulates to the IMS the behaviour of a single user terminal.

According to a first aspect of the present invention there is provided a method of operating a communication system comprising an IP Multimedia Subsystem network, the method comprising:

interposing between a plurality of Session Initiation Protocol User Agents and a Serving Call/Session Control Function of the IP Multimedia Subsystem, a logical entity which registers its contact address with the Serving Call/Session Control Function on behalf of Session Initiation Protocol User Agents so as to emulate a single Session Initiation Protocol User Agent to the Serving Call/Session Control Function.

The method may comprise, in response to receipt of a SIP REGISTER method in the IP Multimedia Subsystem network from a Session Initiation Protocol User Agent, selectively delegating Home Session Initiation Protocol Registrar functions for that Session Initiation Protocol User Agent to allow said logical entity to perform IP Multimedia Subsystem network registrations and de-registrations on behalf of the Session Initiation Protocol User Agent.

A Session Initiation Protocol User Agent may be located in an end user terminal. Alternatively, where a non-Session Initiation Protocol User Agent is located in the end user terminal, the corresponding Session Initiation Protocol User Agent may be located between the non-Session Initiation Protocol User Agent and said logical entity, within an interface identifier which translates between non-Session Initiation Protocol and Session Initiation Protocol signalling.

The method may comprise originating a request for a Session Initiation Protocol session at said logical entity, on behalf of a Session Initiation Protocol User Agent.

The method may comprise terminating a request for a Session Initiation Protocol session at said logical entity, on behalf of a Session Initiation Protocol User Agent.

According to a second aspect of the present invention there is provided a method of operating a processing and signalling entity within a communication system comprising an IP Multimedia Subsystem network, the method comprising:

causing the entity to register its contact address with the Serving Call/Session Control Function on behalf of a plurality of Session Initiation Protocol User Agents so as to emulate a single Session Initiation Protocol User Agent to the Serving Call/Session Control Function.

According to a third aspect of the present invention there is provided a processing and signalling entity for use within a communication system comprising an IP Multimedia Subsystem network, the entity comprising:

means for causing the entity to register its contact address with the Serving Call/Session Control Function on behalf of a plurality of Session Initiation Protocol User Agents so as to emulate a single Session Initiation Protocol User Agent to the Serving Call/Session Control Function.

DETAILED DESCRIPTION

It is proposed here to introduce into the IP Multimedia Subsystem (IMS) as currently defined, the concept of a network-based "Terminal Agent", as well as new procedures to implement the concept in the IMS. The Terminal Agent is a new type of logical entity in the IMS network that represents and emulates to the IMS the behaviour of a single terminal. The concept is particularly applicable for terminals that access the IMS through non-SIP interfaces although it is also applicable to terminals that may have any number of non-SIP and SIP interfaces to the IMS, and where the connectivity over these interfaces may be changing dynamically. The Terminal Agent includes logic to receive traffic from the different terminal interfaces and to forward this traffic to the IMS core, as well as to receive traffic from the IMS core and direct it to the correct interfaces of the user terminal. The Terminal Agent is able to make routing decisions based on a number of criteria including connectivity, user preferences, operator policies, etc. For session continuity, a user terminal communicates with its Terminal Agent to switch a session or media between the different interfaces.

Figure 1:
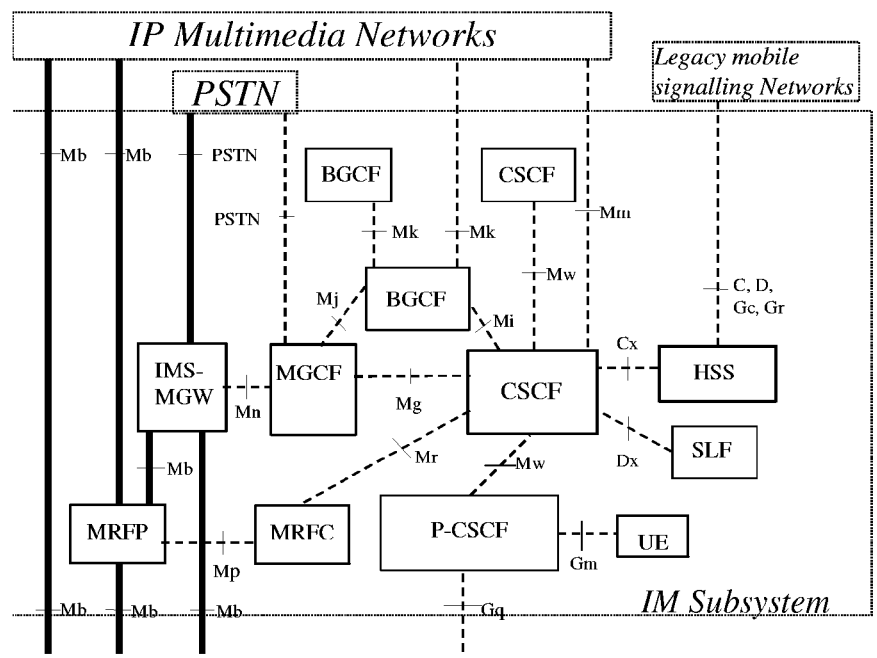
FIG. 1 illustrates schematically the configuration of entities within an IP Multimedia Subsystem.
Figure 2:
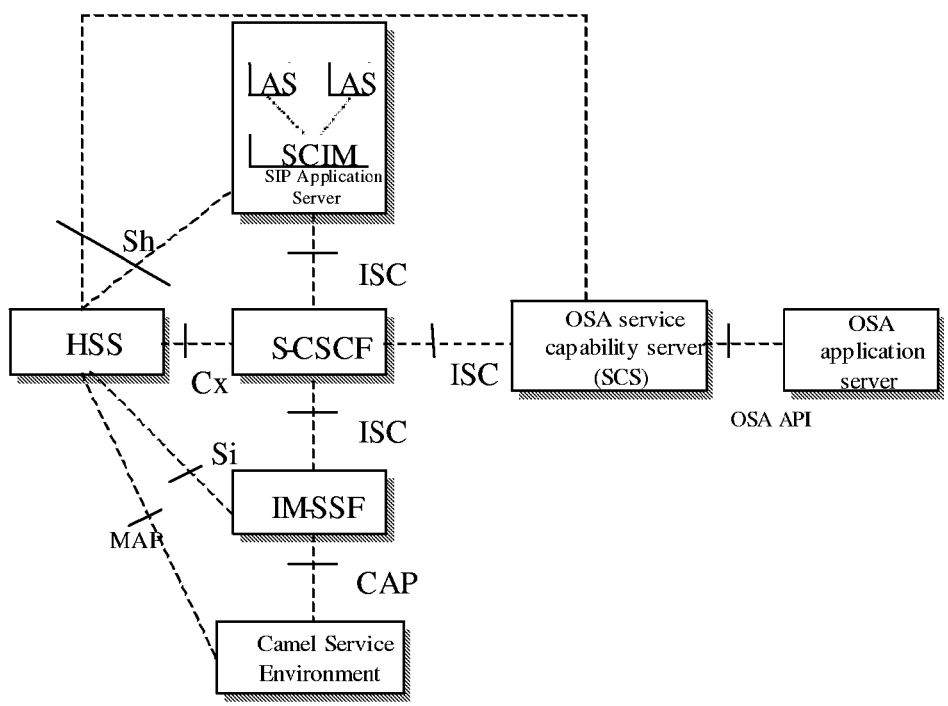
FIG. 2 illustrates the functional architecture for the provision of services within the IP Multimedia Subsystem.
Figure 3:
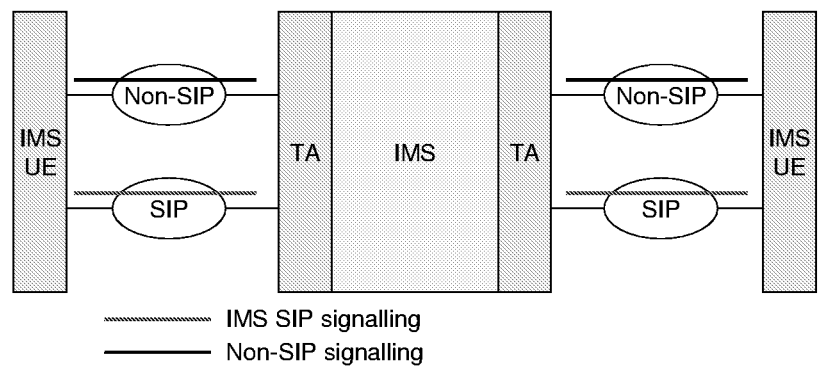
FIG. 3 illustrates schematically the interposing of a Terminal Agent (TA) between user equipment (UE) and an IMS core.
Figure 4:
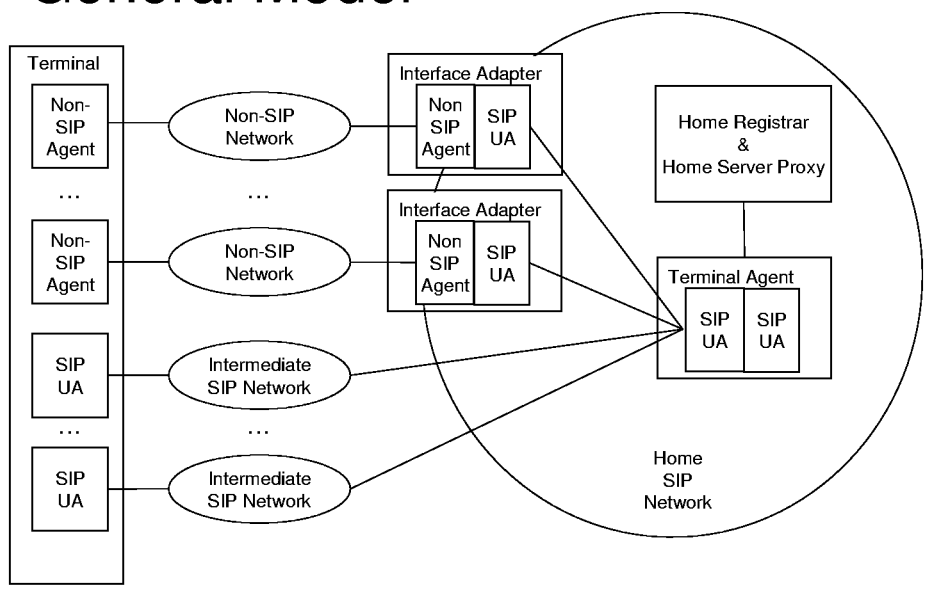
FIG. 4 illustrates schematically a communications system comprising a set of Interface Adaptors interposed between a UE and a Terminal Agent.

FIG. 3 illustrates schematically the interposing of a Terminal Agent (TA) between user equipment (UE) and the IMS core. A Terminal Agent is provided in respect of both peer UEs involved in a session facilitated by the IMS. FIG. 4 illustrates this scenario in more detail for one side of the IMS session.

Interworking of non-SIP agents (at the UE) with the IMS core is facilitated by a set of "Interface Adapters" (IAs) which are typically located in a user's home network, although they may be located in a visited network. The role of an Interface Adapter is to translate between non-SIP control signalling and SIP control signalling and the associated user plane protocols. More specifically, an Interface Adapter provides for: translation between connectivity/capability events on non-SIP interface and SIP events; translation of terminal-originated service requests on non-SIP interface to SIP requests; and translation of terminal-terminated SIP requests to service requests on non-SIP interface. The Interface Adapter is therefore a representation of the terminal's non-SIP control and media interfaces in the Home SIP Network. The Interface Adapter may also translate between the terminal's non-native user/service data management interface and a native data management interface in the Home Network.

The Terminal Agent coordinates activity to and from the Interface Adapters and SIP UAs of the terminal, and emulates single terminal behaviour towards the IMS Home Registrar and Home Server Proxy (of the Home SIP Network). The Terminal Agent may have a knowledge of a user terminal's capabilities and connectivity over all of its network interfaces and may, together with the terminal, decide which interface or interfaces are used for a particular SIP session.

Figure 5:
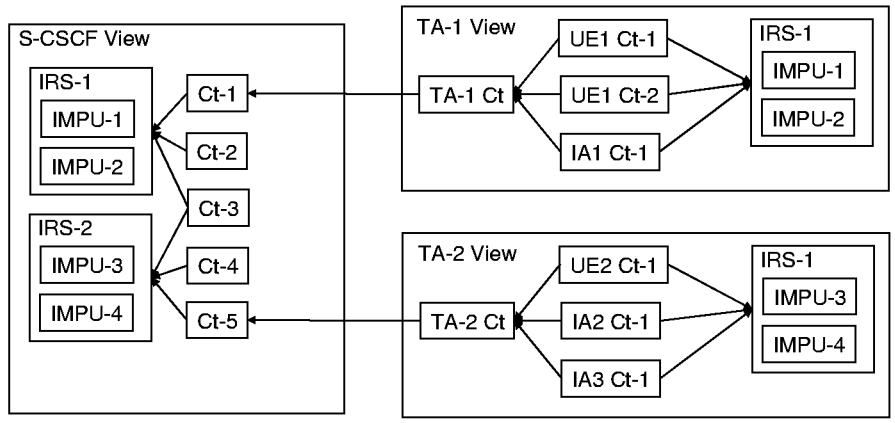
FIG. 5 illustrates schematically address mappings within the IP Multimedia Subsystem.

FIG. 5 depicts an example of binding between contact addresses, implicit registration sets and public user identities (IMPUs) when the registrar functions are distributed between the S-CSCF and a pair of Terminal Agents. The example shows a Terminal Agent 1 responsible for particular (end-user) terminal equipment. The terminal equipment has three interfaces (3 SIP UAs) currently registered: two from the user equipment, UE1 Ct-1 and UE1 Ct-2, and one through the Interface Adapter 1, IA1 Ct-1. All of these contact addresses are bound to the IMPU-1 and IMPU-2 within an Implicit Registration Set 1, IRS-1. These contact addresses are only visible in the Terminal Agent 1, i.e. they are not visible in the S-CSCF. The Terminal Agent 1 is represented in the S-CSCF by the contact address Ct-1, which the TA-1 has registered, and for which the S-CSCF has created bindings to the IMPUs in the Implicit Register Set 1.

The example of FIG. 5 also shows a Terminal Agent 2 representing another terminal with three interfaces currently registered: one from the user equipment UE2 Ct-1, and two through Interface Adapters, IA1 Ct-1 and IA3 Ct-1. All of these contact addresses are bound to IMPU-3 and IMPU-4 within an Implicit Registration Set 1, IRS-1 (note that this is the only implicit registration set visible to this TA). These contact addresses are only visible in the Terminal Agent 2, i.e. they are not visible in the S-CSCF. The Terminal Agent 2 is represented in the S-CSCF by the contact address Ct-5, which the TA-2 has registered, and for which the S-CSCF has created bindings to the IMPUs 3 and 4 in its Implicit Register Set 2.

Figure 6:
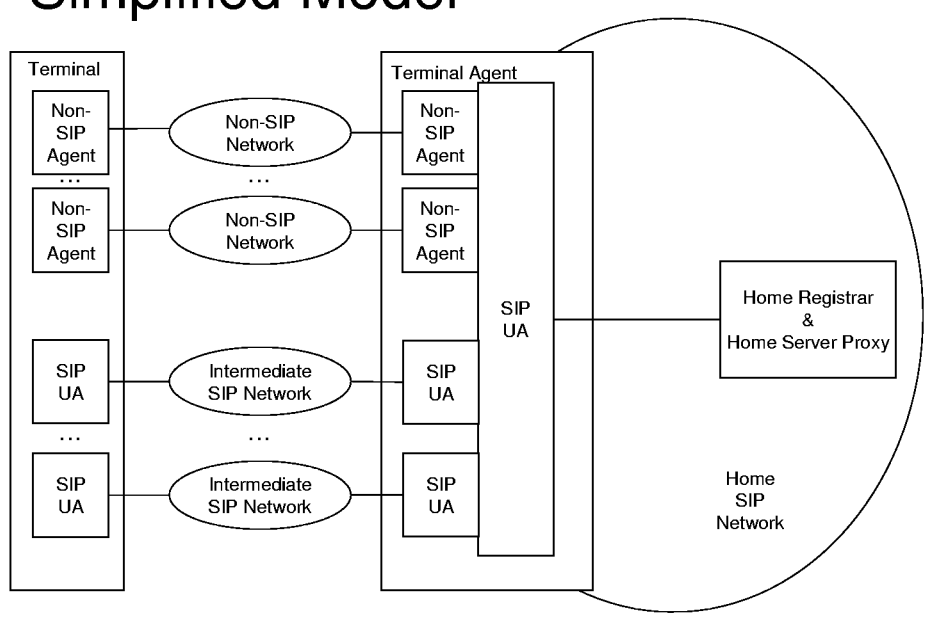
FIG. 6 illustrates schematically a communications system architecture in which Interface Adapters are integrated into a Terminal Agent.

FIG. 6 illustrates schematically a simplified architecture in which Interface Adapters are integrated into the Terminal Agent. Other combinations of Interface Adapters and Terminal Agent are also possible, e.g. where some Interface Adapters are integrated into the Terminal Agent while others are stand-alone.

Referring to FIGS. 4 and 6, the "Intermediate SIP Network" includes the Proxy Call/Session Control Function (P-CSCF) allocated to the UE. Conventionally the "Home Registrar" is implemented in Home Subscriber Server (HSS) and the Serving Call/Session Control Function (S-CSCF). The Home Sever Proxy is implemented in the S-CSCF. The Terminal Agent and the Interface Adapter may be modelled in IMS as SIP Application Servers.

Implementation of the Terminal Agent within the IMS requires the delegation of Home SIP Registrar functions for a set of SIP user agents to the Terminal Agent, whereupon the Terminal Agent acts as a SIP Registrar for the set of served SIP user agents and handles the following functions:
   Registration of served SIP UA
   Re-registration of served SIP UA
   De-registration of served SIP UA
   Subscription to registration event package from served SIP UA
   Notification of registration event to served SIP UA
Implementation also requires the delegation of Home SIP Server Proxy functions for a set of SIP user agents to the Terminal Agent. The Terminal Agent acts as a Home SIP Server Proxy and handles the following functions:
   Originating request from served SIP UA
   Terminating request to served SIP UA(s)

It is noted that these concepts are generic, and may be used to implement other architectural concepts. For example, these mechanisms may be used to implement a terminal monitor that is an entity monitoring the status of a terminal device with special status signalling between the terminal device and the terminal monitor.

Figure 7:
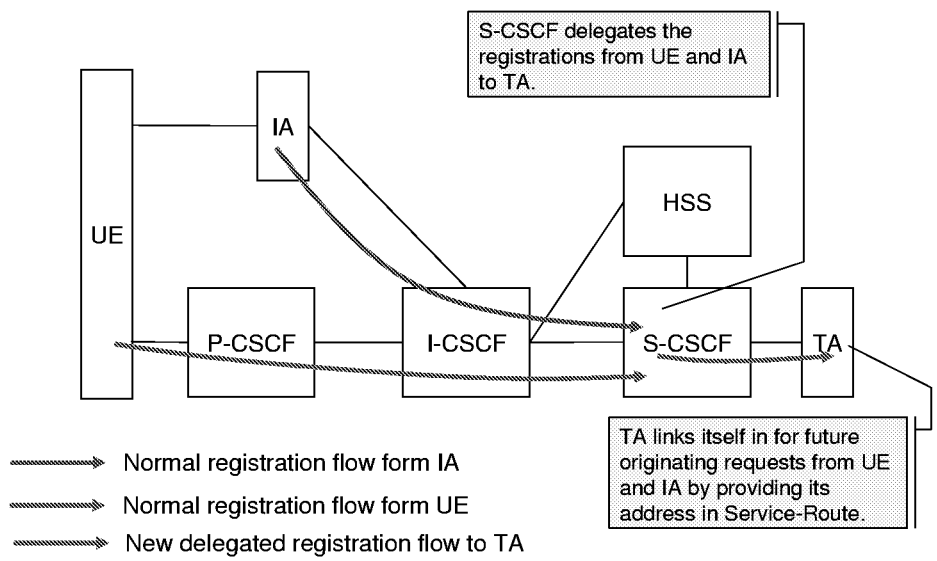
FIG. 7 illustrates a general mechanism for delegating register functions to a Terminal Agent in the IMS.

The general mechanism for delegating register functions to a Terminal Agent in the IMS is depicted in FIG. 7. A registration flow from any endpoint (SIP UA in the UE or in the IA) may be delegated. Registrations from all the endpoints representing interfaces of a particular terminal shall be delegated to the terminal's Terminal Agent. A UE initiated registration flow is forwarded to the S-CSCF according to the normal existing procedures. An IA initiated registration flow is also forwarded to the S-CSCF.

The S-CSCF is responsible for deciding whether or not to delegate the registrar function to a Terminal Agent. The decision can be made based upon information received from the endpoint (UE or IA), user profile data received from the HSS, or some other local network policy. Once a decision has been made to delegate, the S-CSCF shall forward the registration flow to the selected Terminal Agent. Contrary to the pre-existing procedures, the S-CSCF shall not store any of the endpoint contact information. When the Terminal Agent receives the registration flow and accepts the handling of the registrar functions, i.e. it agrees to serve the SIP UA of a particular terminal, the Terminal Agent shall link itself into the path for future originating requests from the endpoint, by providing its address to the registering endpoint in the response registration flow.

Figure 8:
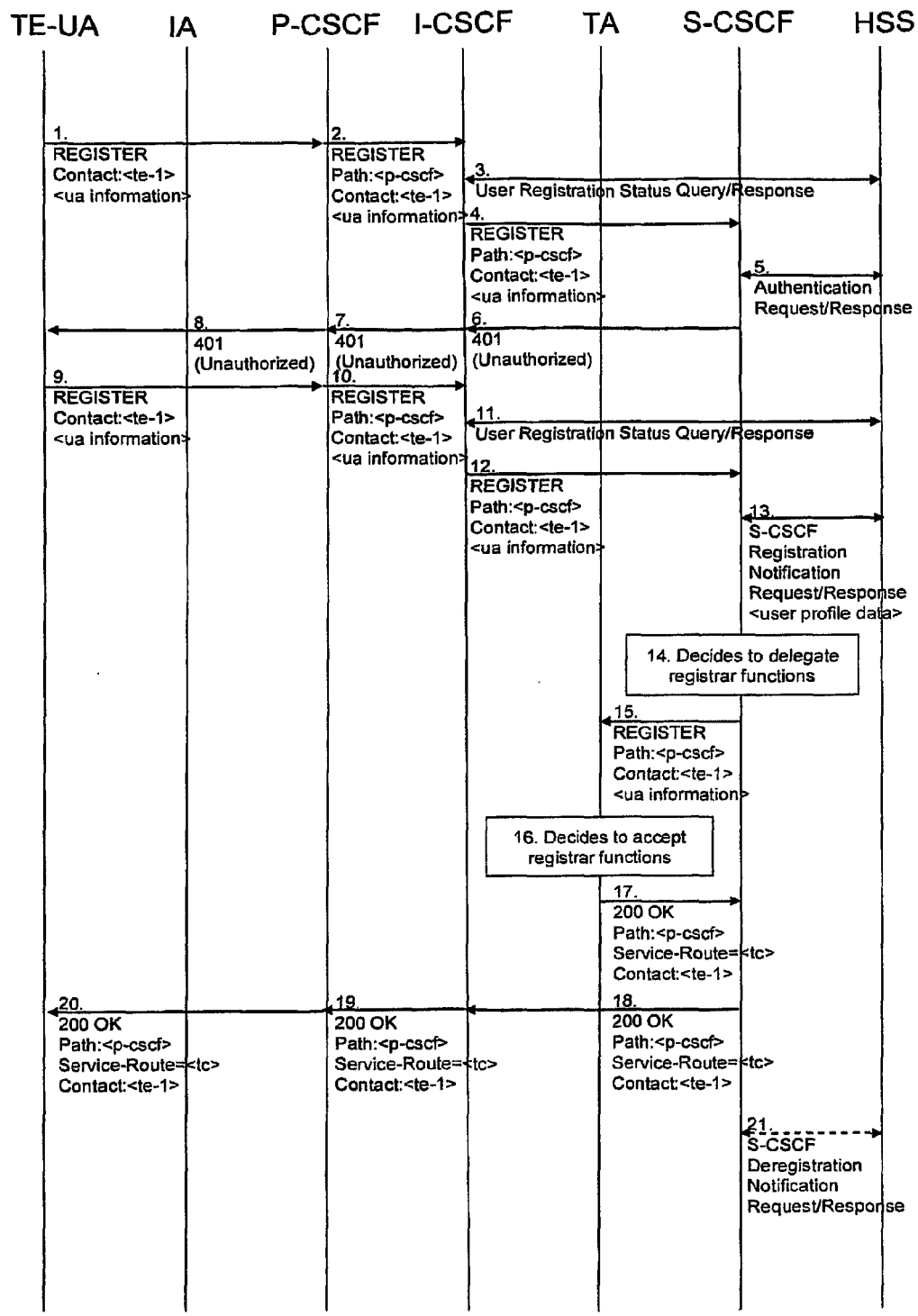
FIG. 8 illustrates in detail the signalling steps associated with the delegation process of FIG. 7.

FIG. 8 illustrates in detail the process for delegating SIP Registrar functions to a Terminal Agent. The process is based on the procedures specified in 3GPP TS 24.229 and TS 29.228 and involves the following:
   1. The terminal's SIP UA (TE-UA) decides to initiate the registration procedure and sends a REGISTER request to the discovered P-CSCF. The TE-UA includes, among other information, the user's temporary or public user identity and the TE-UA's contact address to be registered in the IMS. The TE-UA may also include media feature tags and other contact header parameters as part of the UA information. TE-UA shall also include User Agent information that may include any of the following pieces of information:
       An indication that the UA belongs to terminal equipment with multiple interface capabilities (e.g. with CS and PS interfaces). This capability could for instance be represented as a new media feature tag (RFC 3840).
       A unique identification of the terminal equipment hosting the UA.
       A unique identification of the SIP UA. This could for instance be represented as the SIP instance identity as specified in draft-ietf-sip-gruu-06.
       An explicit indication that the UE requires a Terminal Agent.
   2. P-CSCF inserts a Path header with its own address and forwards the request with the received UA information unmodified to an I-CSCF.
   3. The I-CSCF checks the user registration status with the HSS. The I-CSCF performs S-CSCF selection if one is not already assigned.
   4. The I-CSCF forwards the REGISTER request to the S-CSCF.

5. On reception of the REGISTER message the S-CSCF determines if the REGISTER request is to be authenticated. The S-CSCF may interact with the HSS for this purpose and may initiate an authentication challenge for an unprotected REGISTER.

6-12. Steps 6 to 12 envisage the possible authentication challenge and response according to the existing procedures. The UA information (as described in step 1) is carried also in the protected REGISTER request.

13. Upon receipt of the protected (authenticated) REGISTER request, the S-CSCF may, if required, perform the registration notification procedure with HSS. As part of this procedure (executed at this point or earlier) the S-CSCF obtains the user profile data. A new type of Initial Filter Criteria (IFC) or a new type of Filter Criteria—referred to hereinafter as "Delegation Filter Criteria"—is added to indicate that registration delegation is to be performed when the IFC's service point triggers are met. The Delegation Filter Criteria includes the address of the delegated registrar node. The existing information element "ServerName" of an Application Server object can be used for this purpose, or a new object can be defined. The filter criteria of the new type can also be included in the Shared IFC set that is stored locally in the S-CSCF and referred to in the user profile data.

14. Having received the protected REGISTER request and having obtained the user profile data, the S-CSCF shall make a decision as to whether or not to delegate registration. This decision can be based on one of the following criteria:

Delegation Filter Criteria (DFC) provided or referred to in the user profile data. The DFC will typically (but not necessarily) be set to match any of the UA Information described in step 1. If the DFC are met, the S-CSCF shall delegate the registration to the delegate registrar node address provided in the DFC.

Local network policy defined in the S-CSCF, e.g. that all or none of the registrations shall be delegated. The address of the delegate registrar node is provided as part of the local network policy.

15. In case the S-CSCF decides to delegate the registration, the S-CSCF shall forward the received REGISTER request to the address of the delegate registrar, i.e. the address is that of the Terminal Agent. If the public user identity being registered (in the To and From headers) is a temporary or a barred one, the S-CSCF may replace it with the default, non-barred associated public user identity before sending it to the delegate registrar. In this way the Terminal Agent may not need to be aware of any temporary and barred public user identities. If the S-CSCF does not perform this modification, the Terminal Agent shall handle the temporary and barred public user identities.

16. Upon reception of the delegated REGISTER request, the Terminal Agent shall decide whether to accept or reject the delegation. This decision can be based on the information provided in the REGISTER request and/or provisioning information stored or otherwise obtained by the Terminal Agent. If the Terminal Agent decides to reject the delegation it shall return to the S-CSCF a 404 (Not Found) response (this is not shown in the sequence). If however the Terminal Agent decides to accept the delegation it shall take over the role of the registrar for the registered contact. The TA shall thereafter perform the following actions that are otherwise specified as S-CSCF functions in 3GPP TS 24.229 (section 5.4.1.2.2).

The TA shall bind to the registered public user identity all registered contact information including all header parameters contained in the Contact header and store the information for future use.

The TA shall check whether a Path header was included in the REGISTER request and construct a list of pre-loaded Route headers from the list of entries in the Path header. The TA shall preserve the order of the preloaded Route headers and bind them to the contact information that was received in the REGISTER message. If this registration is a re-registration, then a list of pre-loaded Route headers will already exist. The new list replaces the old list.

The TA shall determine the duration of the registration by checking the value of the Expires header in the received REGISTER request. The TA may reduce the duration of the registration due to local policy or send back a 423 (Interval Too Brief) response specifying the minimum allowed time for registration (not shown in the sequence).

17. The Terminal Agent shall return a 200 (OK) response to the REGISTER request, including the following.

The list of received Path headers.

A Service-Route header containing the address of the Terminal Agent for reception of originating requests. This address will typically be a different address to the "generic" address used by the S-CSCF to route the REGISTER message to the TA in the first instance, and is bound at the TA to the SIP contact of the terminal equipment. In this way the Terminal Agent links itself in for future originating requests from the served TE-UA.

Contact header(s) listing all contact addresses for this public user identity that the Terminal Agent has stored.

Figure 10:
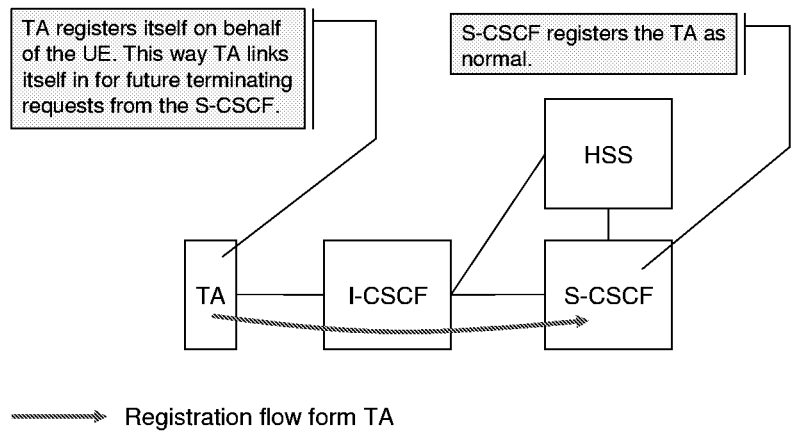
FIG. 10 illustrates schematically a general mechanism used by a Terminal Agent to register with the S-CSCF on behalf of a UE following delegation of registrar functions to the Terminal Agent.

The general mechanism used by a Terminal Agent to register with the S-CSCF on behalf of a UE is depicted in FIG. 10. In this way the Terminal Agent makes it known to the S-CSCF that it wishes to receive all terminating requests sent from the S-CSCF towards the UE. It is a policy decision for the Terminal Agent to decide when to register on behalf of a terminal, although registration would be triggered by an end-point (IA or UE) registration and/or when the Terminal Agent becomes aware of the terminal gaining connectivity to the IMS. The Terminal Agent registers UA capabilities and user preferences based on such information received from the endpoint(s) and/or pre-configured information.

18. Upon reception of a 200 (OK) response to the delegated REGISTER, the S-CSCF may modify the response before forwarding it to the I-CSCF as detailed below. After sending the response, the S-CSCF may optionally deregister itself from the HSS as described in step 21 below.

The S-CSCF shall add a P-Associated-URI header containing the list of the registered public user identity and its associated set of implicitly registered public user identities according to 3GPP TS 24.229.

If the S-CSCF has replaced a temporary or barred identity, it shall restore the To and From header fields to their original values.

If the S-CSCF determines that authentication of the originating request will be required (which may be the case in the so-called early IMS deployments), the S-CSCF may add a Service-Route header with its own address for reception of originating requests. In this way the Terminal Agent need not be involved in the authentication procedures. Note that this is not shown in the sequence.

If network topology hiding is required, the S-CSCF shall add a Service-Route with a SIP URI identifying an Interconnection Border Control Function (IBCF—defined in 3GPP IMS Release 7 defined in 23.228) as the topmost entry according to 3GPP TS 24.229. This is not shown in the sequence.

The S-CSCF shall include a P-Charging-Function-Addresses header containing the values received from the HSS if the P-CSCF is in the same network as the S-CSCF according to 3GPP TS 24.229.

The S-CSCF shall add a Contact header(s), listing all the contact addresses it may have already stored for the registered public user identity.

19. The I-CSCF forwards the 200 (OK) response to the P-CSCF according to the existing procedure in 3GPP TS 24.229.

20. Upon reception of the 200 (OK) response the P-CSCF shall save the list of Service-Route headers preserving the order. The P-CSCF shall store this list during the entire registration period of the respective public user identity. The P-CSCF shall forward the 200 (OK) response to the TE-UA. The TE-UA shall on reception of the response store the list of Service-Route headers contained in the Service-Route header, in order to build a proper preloaded Route header value for new dialogs and standalone transactions. These are existing procedures in 3GPP TS 24.229.

21. Having returned the 200 (OK) response, the S-CSCF may optionally deregister itself from the HSS if the S-CSCF has no registered contacts stored for the registered public user identity and if the S-CSCF has not provided its address in the Service-Route header in step 18 above.

After having successfully delegated the registration functions to the TA, the S-CSCF shall not send a third-party REGISTER request to any AS even if there are Initial Filter Criteria that match the REGISTER request.

Figure 9:
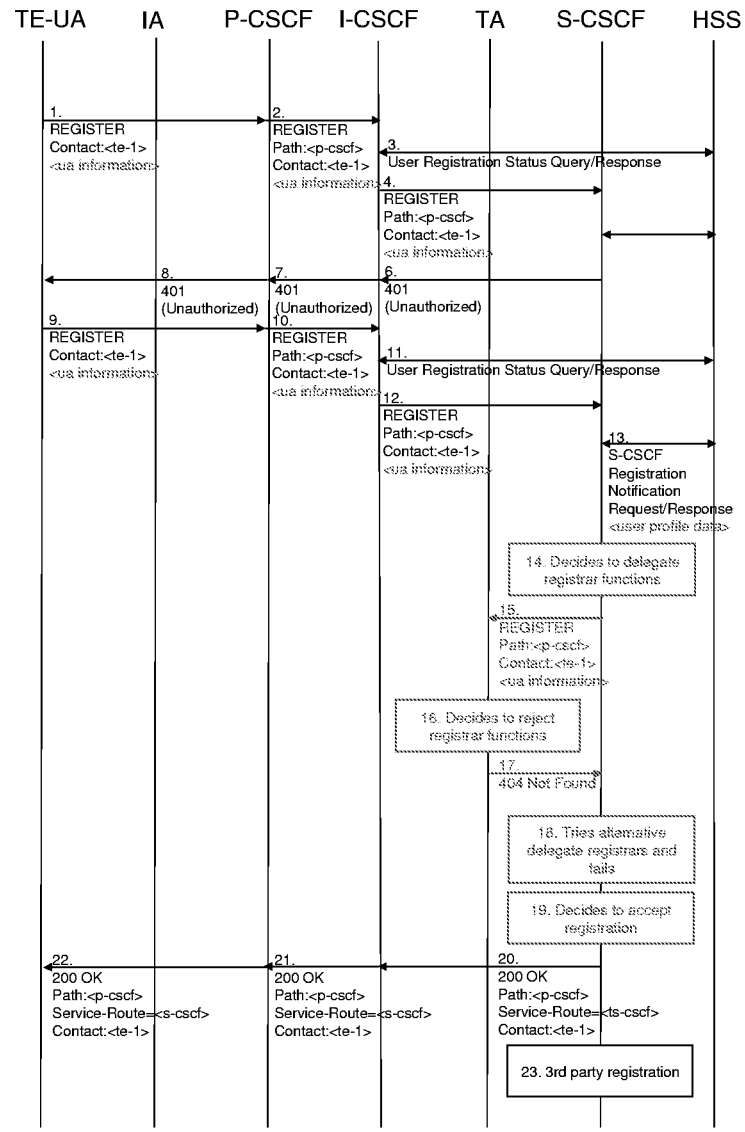
FIG. 9 illustrates a modified process in which a Terminal Agent declines a registration delegation request.

As noted above, the Terminal Agent may decide not to accept a delegated registration from the S-CSCF. In this case, the procedure illustrated in FIG. 9 is followed. Steps 17 onwards are modified as follows:

17. If the Terminal Agent decides to reject the delegated registration, e.g. because it does not have data necessary to serve the registering terminal, the Terminal Agent shall return to the S-CSCF a 404 (Not Found) response.

18. Upon reception of the 404 (Not Found) response to the delegated REGISTER request, the S-CSCF may attempt to delegate the request to another Terminal Agent, for example where the address of the Terminal Agent has resolved to more than one host or if it has additional matching DFC or local policy providing one or more alternative node address. If an alternative is available, the S-CSCF may send the delegated REGISTER request to that node, and continue from step 15 of the previous sequence.

19. In the case where the delegated registration is rejected and no alternative delegate node is available (or all alternatives have already been tried and failed), the S-CSCF may decide to perform its normal registrar functions and accept the registration, in which case it shall fall back to the existing procedures in 3GPP TS 24.229.

Once this process has been completed for the first time, the Terminal Agent is linked in between the IMS Core and the TE-UA, i.e. the TA will receive all SIP traffic generated by the TE-UA and it will receive all traffic forwarded by the IMS Core towards the terminal. Only if a TE-UE uses a SIP REGISTER method will the S-CSCF be forced to perform the registration.

Figure 11:
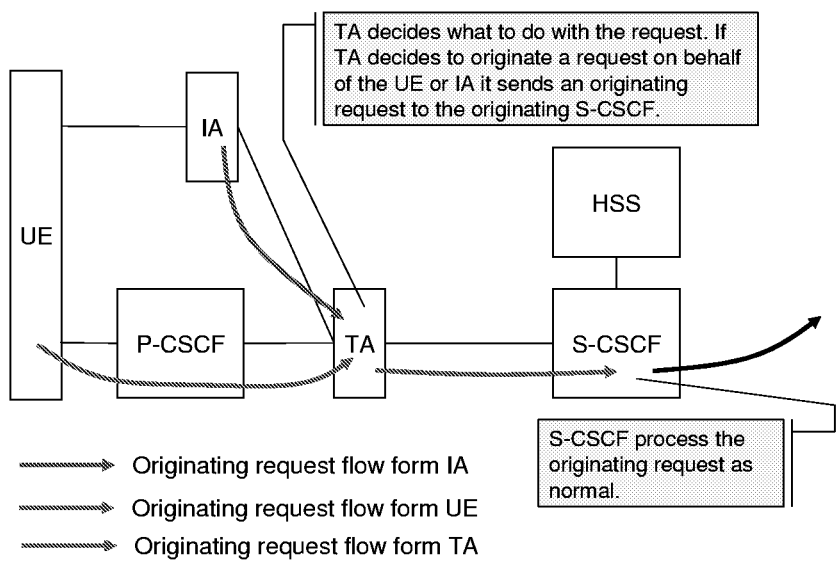
FIG. 11 illustrates schematically a general mechanism used by a Terminal Agent to handle requests originating from a SIP UA for which registrar functions have been delegated to the Terminal Agent.

Thanks to the delegation/registration procedures described above, any request originated by any of the endpoints (SIP UA in the UE or in the IA) will arrive at the Terminal Agent, as depicted in FIG. 11. The Terminal Agent will then make a decision whether to progress the request into the IMS, and if so it shall originate a request to the S-CSCF with which it has registered. The S-CSCF shall perform the pre-existing originating request procedures including originating services execution, before it forwards the request to the terminating network. The fact that a special type of terminal is in use is transparent to the S-CSCF and the executing services.

Figure 12:
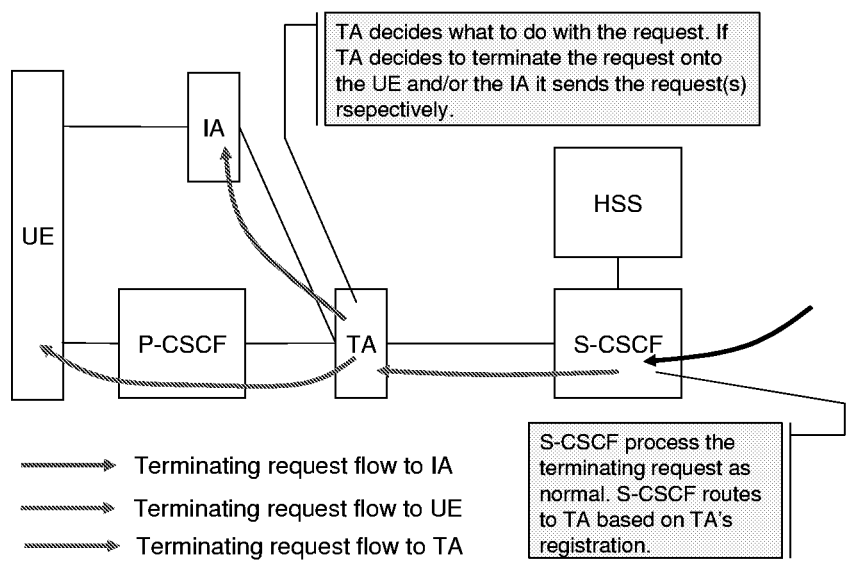
FIG. 12 illustrates schematically a general mechanism used by a Terminal Agent to handle terminating requests for a SIP UA for which registrar functions have been delegated to the Terminal Agent.

When a terminating request arrives at the S-CSCF, the S-CSCF shall perform the pre-existing procedures for terminating service execution and terminating request routing. This is illustrated in FIG. 12. Routing of the terminating request to the registered SIP UAs is done by the S-CSCF based on registered UA capabilities, contact parameters and caller preferences. The Terminal Agent's registered contact may be selected according to these procedures and, if selected, the S-CSCF forwards the terminating request flow to the Terminal Agent. It is for the Terminal Agent to decide how to progress the request. The decision may be based on the current status and capabilities of the different interfaces of the user terminal. The Terminal Agent may decide to use any of the available interfaces suitable to terminate the request, and it may even decide to forward the request to more than one interface of the terminal if it deems it possible that different components of the request may be served by different interfaces.

The registration flow for re-registration of a SIP UA already served by the Terminal Agent is essentially the same as that described above with reference to FIG. 8, with the difference that, as the Terminal Agent is already serving the re-registering SIP UA, it shall accept the registration delegation in step 16 of the normal flow.

The registration flow for de-registration of a SIP UA already served by the Terminal Agent is again similar to that described with reference to FIG. 8, but with the difference that, as the Terminal Agent is already serving the deregistering SIP UA, it shall accept the registration delegation in step 16 of the normal flow. The SIP UA effects de-registration by sending the REGISTER request with the Expires header field containing the value zero. When the Terminal Agent receives this REGISTER request, which is delegated to it by the S-CSCF, the Terminal Agent shall decide what to do with any ongoing SIP session that involves this SIP UA and the contact address being de-registered. The Terminal Agent may decide to release the session or to move the session to another of the interfaces that may be currently available at the terminal equipment. Moving the session to another interface may involve updating the session properties, e.g. due to the interface to which the session is moved possessing a different capability set.

If this SIP UA was the only SIP UA registered in the Terminal Agent related to this terminal equipment, the Terminal Agent may decide to de-register its own contact address from the S-CSCF. Otherwise, the Terminal Agent will only remove the contact address being de-registered and its binding to the Public User Identity(ies).

If all Public User Identities of the SIP UA are de-registered, then the Terminal Agent may consider the SIP UA and P-CSCF subscriptions to the registration event package cancelled (i.e. as if the SIP UA had sent a SUBSCRIBE request with an Expires header containing a value of zero).

Other events which may be handled by the Terminal Agent include subscription to registration event package from a served SIP UA and notification of registration event to a served SIP UA.

It will be appreciated by the person of skill in the art that various modifications may be made to the above described embodiments without departing from the scope of the present invention.

The invention claimed is:

1. A method of operating a communication system comprising an Internet Protocol Multimedia Subsystem (IMS) network, the method comprising:
- interposing a terminal agent between a plurality of Session Initiation Protocol (SIP) User Agents and a Serving Call/Session Control Function (S-CSCF) of the IMS network;
- registering a contact address of the terminal agent with the S-CSCF on behalf of the SIP User Agents;
- emulating by the terminal agent, a single SIP User Agent to the S-CSCF;
- receiving a SIP REGISTER message in the IMS network from a given SIP User Agent; and
- in response to receipt of the SIP REGISTER message, selectively delegating Home SIP Registrar functions for the given SIP User Agent to allow the terminal agent to perform IMS network registrations and de-registrations on behalf of the given SIP User Agent, wherein the Home SIP Registrar functions are selectively delegated based upon Initial Filter Criteria (IFC) obtained by the S-CSCF for a user.

2. The method according to claim 1, wherein the IFC include the address of the terminal agent.

3. The method according to claim 1, wherein at least one of the SIP User Agents is located in an end user terminal.

4. The method according to claim 1, further comprising originating a request for a SIP session at the terminal agent on behalf of a given SIP User Agent.

5. The method according to claim 1, further comprising terminating a request for a SIP session at the terminal agent on behalf of a given SIP User Agent.

6. The method according to claim 1, wherein at least one of the SIP User Agents is located between a non-SIP User Agent and the terminal agent.

7. The method according to claim 6, further comprising performing a translation between non-SIP and SIP signaling within the IMS network.

8. A method of operating a communication system comprising an Internet Protocol Multimedia Subsystem (IMS) network, the method comprising:
- interposing a terminal agent between a plurality of Session Initiation Protocol (SIP) User Agents and a Serving Call/Session Control Function (S-CSCF) of the IMS network;
- registering a contact address of the terminal agent with the S-CSCF on behalf of the SIP User Agents;
- emulating by the terminal agent, a single SIP User Agent to the S-CSCF;
- receiving a SIP REGISTER message in the IMS network from a given SIP User Agent; and
- in response to receipt of the SIP REGISTER message, selectively delegating Home SIP Registrar functions for the given SIP User Agent to allow the terminal agent to perform IMS network registrations and de-registrations on behalf of the given SIP User Agent, wherein the Home SIP Registrar functions are selectively delegated to the terminal agent based upon a local delegation policy of the Serving Call/Session Control Function.

9. A method of operating a communication system comprising an Internet Protocol Multimedia Subsystem (IMS) network, the method comprising:
- interposing a terminal agent between a plurality of Session Initiation Protocol (SIP) User Agents and a Serving Call/Session Control Function (S-CSCF) of the IMS network;
- registering a contact address of the terminal agent with the S-CSCF on behalf of the SIP User Agents;
- emulating by the terminal agent, a single SIP User Agent to the S-CSCF;
- receiving a SIP REGISTER message in the IMS network from a given SIP User Agent;
- in response to receipt of the SIP REGISTER message, selectively delegating Home SIP Registrar functions for the given SIP User Agent to allow the terminal agent to perform IMS network registrations and de-registrations on behalf of the given SIP User Agent;
- forwarding the REGISTER message by the S-CSCF to the terminal agent; and
- in response, the terminal agent registering itself with the IMS network on behalf of the given SIP User Agent and linking the terminal agent into a SIP path for the given SIP User Agent.

10. A terminal agent for use within a communication system comprising an Internet Protocol Multimedia Subsystem (IMS) network, the terminal agent comprising a processor coupled to a non-transitory memory for storing computer program instructions, wherein when the processor executes the computer program instructions, the terminal agent is caused to:
- register a contact address of the terminal agent with a Serving Call/Session Control Function (S-CSCF) in the IMS network on behalf of a plurality of Session Initiation Protocol (SIP) User Agents; and
- emulate a single SIP User Agent to the S-CSCF;
- wherein when a SIP REGISTER message is received in the IMS network from a given SIP User Agent, the terminal agent is configured to:
  - accept a delegation of Home SIP Registrar functions for the given SIP User Agent selectively delegated to the terminal agent by the IMS network; and
  - perform IMS network registrations and de-registrations on behalf of the given SIP User Agent, wherein the Home SIP Registrar functions are selectively delegated to the terminal agent based upon Initial Filter Criteria (IFC) obtained by the S-CSCF for a user or a local delegation policy of the S-CSCF.

11. A terminal agent for use within a communication system comprising an Internet Protocol Multimedia Subsystem (IMS) network, the terminal agent comprising a processor coupled to a non-transitory memory for storing computer program instructions, wherein when the processor executes the computer program instructions, the terminal agent is caused to:
- register a contact address of the terminal agent with a Serving Call/Session Control Function (S-CSCF) in the IMS network on behalf of a plurality of Session Initiation Protocol (SIP) User Agents; and
- emulate a single SIP User Agent to the S-CSCF;
- wherein when a SIP REGISTER message is received in the IMS network from a given SIP User Agent, the terminal agent is configured to:

accept a delegation of Home SIP Registrar functions for the given SIP User Agent selectively delegated to the terminal agent by the IMS network; and receive the REGISTER message forwarded from the S-CSCF; and register itself with the IMS network on behalf of the given SIP User Agent, and link the terminal agent into a SIP path for the given SIP User Agent.

* * * * *